3,034,651
MAGNETIC FILTER CARTRIDGE
Don P. Morrell, 2035 Middlebelt Road, Pontiac, Mich.
Filed Mar. 16, 1960, Ser. No. 15,296
5 Claims. (Cl. 210—222)

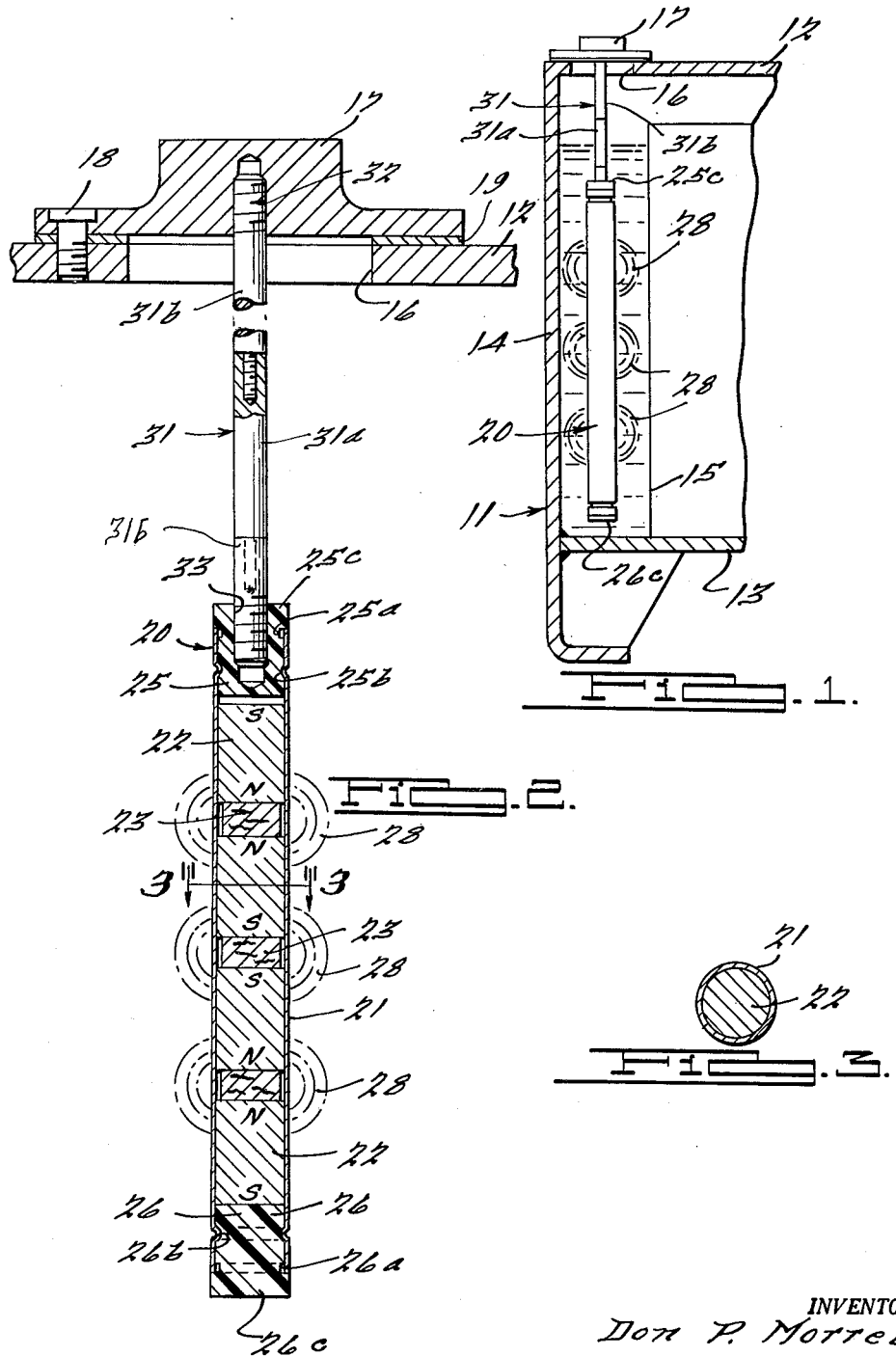

This invention relates to a cartridge-type magnetic filter or trap particularly adapted for use in pipe lines, hydraulic reservoirs and similar fluid containers.

This invention is particularly concerned with an improved, simplified, low cost magnetic filter cartridge that is designed to provide an enlarged magnetic field for increased filtering in the area adjacent the filter cartridge.

It is still another object of this invention to provide a highly efficient magnetic filter trap that has improved filtering properties and at the same time is designed in such a manner that it may be quickly and easily cleaned for repeated, highly effective, filtering operations.

It is still another object of this invention to provide an improved type of magnetic filter unit that is readily formed from conventional elements assembled in an efficient and economical manner so as to provide the optimum filtering action at the minimum cost.

It is a further object of this invention to provide a cartridge-type magnetic filter that is formed in a novel manner from conventional tubular and cylindrical elements assembled in an ingenious fashion.

Other objects and advantages of this invention will be readily apparent from a reading of the following description when considered in connection with the associated drawing wherein:

FIG. 1 is a fragmentary sectional elevational view of a hydraulic reservoir that includes a magnetic filter unit embodying this invention;

FIG. 2 is an enlarged sectional elevational view of the magnetic filter unit shown in FIG. 1; and FIG. 3 is a sectional elevational view taken along the line 3—3 of FIG. 2.

Magnetic filters of different types have been used in the past in hydraulic pipe lines and reservoirs but usually there have been certain disadvantages associated with these filters that have retarded their general acceptance. One of the problems that has been associated with certain magnetic filters offered to industry in the past has resulted from the fact that the magnetic elements have been directly exposed to the fluid medium such that the magnetizable particles filtered out of the fluid attach themselves to the magnetic elements in such a secure manner that it is very difficult to clean the filter unit without the use of compressed air or some other pressurized cleaning means. Another disadvantage of prior magnetic filter units has been that they were often complicated, heavy, bulky devices that were relatively expensive and more or less tailor-made for a particular installation. The filter device embodying this invention overcomes each of the noted disadvantages of prior types of magnetic filter units and provides a new and improved magnetic filter cartridge that can be quickly, easily and economically added to any hydraulic system where it is desired to eliminate magnetizable particles. Secondly, this filter unit is readily cleaned by simply withdrawing the filter unit from its position in the fluid medium and merely wiping off the exterior of the filter cartridge case to quickly and completely remove the magnetizable particles attached to the exterior surface of the non-magnetic case of the filter cartridge.

FIG. 1 of the drawings shows a hydraulic reservoir housing 11 having top and bottom walls 12 and 13, side walls 14 and an interior baffle plate 15. The top wall 12 of the housing 11 is pierced by a port or opening 16 that is adapted to be covered by a removable cap 17. The port 16 can be a fill port for adding fluid to the reservoir 11 or it can be a port specifically designed to seat the magnetic filter 20. It will be noted that a screw 18 is used to anchor the port cap 17 in place. A gasket 19 is used for a leakproof seal around the cap 17.

The cartridge-type magnetic trap or filter 20 that depends from the cap 17 and projects into the liquid of the reservoir housing 11, so as to be submerged therein, is arranged to extend into a narrow fluid passageway between the housing side wall 14 and the baffle plate 15. Magnetic filter 20 comprises a tubular outer casing 21 of a non-magnetic material such as aluminum. Housed concentrically within the non-magnetic tubular casing 21 are a plurality of longitudinally spaced, cylindrically shaped, bar-type magnets 22 that may be made of a magnetic material such as Alnico V or a similar strong magnetic material. Cylindrically shaped spacer blocks 23 of wood, or some non-magnetic plastic material such as polyethylene, are arranged between the adjacent ends of the several magnet bars 22.

Plugging the opposite ends of the tubular non-magnetic casing 21 are non-magnetic, substantially cylindrical, plugs 25 and 26, respectively. These plugs 25, 26 are preferably of some plastic material, such as polyethylene, that is slightly resilient or compressible so that the plugs 25, 26 can be pressed into the bores at the ends of the casing 21 to form liquid tight connections thereto. The plugs 25, 26 may have a slight longitudinally extending taper towards their inner ends to facilitate pressing of the plugs into the open ends of the casing 21. Also, it will be noted that the plugs 25, 26 each have a pair of circumferentially extending, spaced, peripheral grooves 25a, 25b and 26a, 26b respectively that provide portions of the means used to anchor the plugs 25, 26 in the ends of the casing 21. After the plugs 25, 26 have been pressed into the ends of the casing 21 the tubing overlying the plug grooves 25b and 26b, respectively, is pressed into the underlying grooves 25b, 26b so as to lock the plugs 25, 26 to the casing 21. The enlarged end portions 25c and 26c on the outer ends of the plugs 25, 26 limit the entrance of the plugs 25, 26 into the bores in the ends of casing 21 and also provide leakproof seals against the ends of the casing 21.

It will be noted from FIG. 2 that the bar magnets 22 are arranged within the casing 21 in such a manner that similar or like poles of adjacent magnets are placed adjacent one another. This placing of like magnet poles adjacent one another produces a bulged out magnetic flux field, as indicated by the flux lines 28. This flux field 28 is due to the fact that like poles repel each other. This bulged out magnetic flux field 28 encircling the casing 21 materially increases the effective filtering area adjacent the cartridge casing 21 and thereby improves the effectiveness of the filter unit 20, particularly when the magnetic cartridge 20 is placed in a restricted flow channel.

The magnetic filter trap cartridge 20 is suspended in the fluid reservoir housing 11 by means of a support rod generally designated by the numeral 31. Rod 31 may be a multi-section unit composed of threadably connected sections such as 31a and 31b. The lower section 31b is screwed into a bore 33 in the plug 25 whereas the upper section 31b is screwed into a threaded bore 32 in the cap 17. Obviously different length support rods 31 could be used in place of the sectional unit to adapt the cartridge 20 for use in different installations. Likewise the cartridge casing 20 can be made in varying lengths with varying numbers of bar magnets to suit any particular installation.

I claim:
1. A sealed, submersible, magnetic filter cartridge for removal of magnetizable particles suspended in a liquid surrounding said cartridge comprising an open-ended tubular casing of non-magnetizable metallic material having a smooth exterior surface, a plurality of bar-type permanent magnets arranged within said casing in longitudinally spaced relationship, blocks of non-magnetizable material extending between and spacing the adjacent magnets and plugs of non-magnetizable plastic material sealingly mounted in and plugging the opposite open ends of said casing, said plugs each having a peripheral groove underlying a portion of the casing and receiving a depressed, correspondingly peripheral, portion of the overlying casing to anchor the plugs in the casing, at least one of said plugs having a rod attaching formation therein to provide for suspension of said cartridge from the lower end of a support rod.

2. A sealed, submersible, magnetic filter cartridge for removal of magnetizable particles suspended in a liquid surrounding said cartridge comprising an open-ended tubular casing of non-magnetizable metallic material having a smooth exterior surface, a plurality of bar-type permanent magnets arranged within said casing in longitudinally spaced relationship, blocks of spacer material extending between and spacing the adjacent magnets and plugs of non-magnetizable, slightly deformable, material sealingly mounted in and plugging the opposite open ends of said casing, said plugs each being formed with a peripherally extending groove that receives a depressed, correspondingly peripheral, groove portion of the overlying casing with each plug having a cap on the outer end thereof arranged to abut against and sealingly engage the adjacent end of the casing, at least one of said plugs having a rod attaching formation therein to provide for suspension from the lower end of a support rod.

3. A sealed, submersible, magnetic filter cartridge for removal of magnetizable particles suspended in a liquid surrounding said cartridge comprising an open-ended tubular casing of non-magnetizable metallic material having a smooth exterior surface, a plurality of bar-type permanent magnets arranged within said casing in longitudinally spaced relationship, blocks of non-magnetizable material extending between and spacing the adjacent magnets and plugs of non-magnetizable, slightly deformable, plastic material sealingly mounted in and plugging the opposite open ends of said casing, said plugs each having a peripheral groove underlying a portion of the casing and receiving a depressed, correspondingly peripheral, portion of the overlying casing to anchor the plugs in the casing, said plugs also each having a cap on the outer end thereof arranged to abut against and sealingly engage the adjacent end of the casing, at least one of said plugs having a rod attaching formation therein to provide for suspension of said cartridge from the power end of a support rod.

4. A sealed, submersible, magnetic filter cartridge for removal of magnetizable particles suspended in a liquid surrounding said cartridge comprising an open-ended tubular casing of non-magnetizable metallic material having a smooth exterior surface, a plurality of bar-type permanent magnets arranged within said casing in longitudinally spaced relationship, blocks of spacer material extending between and spacing the adjacent magnets and plugs of non-magnetizable material sealingly mounted in and plugging the opposite open ends of said casing, said plugs each having a peripheral groove underlying a portion of the casing and receiving a depressed, correspondingly peripheral, portion of the overlying casing to anchor the plugs in the casing, one of said plugs having a support member threadably connected thereto to provide a means to suspendingly submerge the filter cartridge in liquid.

5. A sealed, submersible, magnetic filter cartridge for removal of magnetizable particles suspended in a liquid surrounding said cartridge comprising an open-ended tubular casing of non-magnetizable metallic material having a smooth exterior surface, a plurality of bar-type permanent magnets arranged within said casing in longitudinally spaced relationship, blocks of spacer material extending between and spacing the adjacent magnets and plugs of non-magnetizable plastic material sealingly mounted in and plugging the opposite open ends of said casing, said plugs each having a peripheral groove underlying a portion of the casing and receiving a depressed, correspondingly peripheral, portion of the overlying casing to anchor the plugs in the casing, one of said plugs having a threaded bore therein with a support member connected thereto to provide a means to suspend the filter cartridge in liquid, said support member depending from a port cover adapted to be detachably connected to a support having a port therein.

References Cited in the file of this patent
UNITED STATES PATENTS

| | | |
|---|---|---|
| 1,806,001 | Simms et al. | May 19, 1931 |
| 2,552,330 | Lamb | May 8, 1951 |
| 2,800,230 | Thoma | July 23, 1957 |
| 2,937,710 | Michael | May 24, 1960 |